United States Patent
Yoon

(10) Patent No.: US 10,846,908 B2
(45) Date of Patent: Nov. 24, 2020

(54) GRAPHICS PROCESSING APPARATUS BASED ON HYBRID GPU ARCHITECTURE

(71) Applicant: SILICONARTS, INC., Seoul (KR)

(72) Inventor: Hyung Min Yoon, Seoul (KR)

(73) Assignee: SILICONARTS, INC., Seoul (KR)

( * ) Notice: Subject to any disclaimer, the term of this patent is extended or adjusted under 35 U.S.C. 154(b) by 0 days.

(21) Appl. No.: 16/427,658

(22) Filed: May 31, 2019

(65) Prior Publication Data

US 2020/0327712 A1    Oct. 15, 2020

(30) Foreign Application Priority Data

Apr. 11, 2019  (KR) .................. 10-2019-0042397

(51) Int. Cl.
| | | |
|---|---|---|
| G06T 15/00 | (2011.01) | |
| G06T 1/60 | (2006.01) | |
| G06T 15/04 | (2011.01) | |
| G06T 15/80 | (2011.01) | |
| G06T 15/06 | (2011.01) | |

(52) U.S. Cl.
CPC .............. *G06T 15/005* (2013.01); *G06T 1/60* (2013.01); *G06T 15/04* (2013.01); *G06T 15/06* (2013.01); *G06T 15/80* (2013.01); *G06T 2210/21* (2013.01)

(58) Field of Classification Search
CPC ..... G06T 15/06; G06T 15/80; G06T 2210/52; G06T 2210/36; G06F 9/5016
See application file for complete search history.

(56) References Cited

U.S. PATENT DOCUMENTS

| | | | |
|---|---|---|---|
| 10,217,266 B2 * | 2/2019 | Howson | G06T 15/80 |
| 2014/0078143 A1 * | 3/2014 | Lee | G06T 15/06 |
| | | | 345/426 |
| 2014/0347355 A1 * | 11/2014 | Yoon | G06T 15/06 |
| | | | 345/419 |
| 2019/0236831 A1 * | 8/2019 | Akenine-Moller | G06T 15/06 |
| 2020/0051317 A1 * | 2/2020 | Muthler | G06F 9/3877 |

FOREIGN PATENT DOCUMENTS

| | | |
|---|---|---|
| KR | 10-2002-0068054 A | 8/2002 |
| KR | 10-2015-0060871 A | 6/2015 |
| KR | 10-2016-0142166 A | 12/2016 |

OTHER PUBLICATIONS

Pagliosa et. al. A Hybrid GPU Rasterized and Ray Traced Rendering Pipeline for Real Time Rendering of Per Pixel Effects, 2012, M. Herrlich, R. Malaka, and M. Masuch (Eds.): ICEC 2012, LNCS 7522, pp. 292-305, 2012.*
Korean Office Action for related KR application No. 10-2019-0042397 dated Mar. 5, 2020 from Korean Patent Office.

* cited by examiner

*Primary Examiner* — Samantha (Yuehan) Wang
(74) *Attorney, Agent, or Firm* — Paratus Law Group, PLLC

(57) ABSTRACT

Disclosed is a graphics processing apparatus based on hybrid GPU architecture. The graphics processing apparatus includes: an acceleration structure generation unit generating an acceleration structure based on geometry data related to a 3D scene; a ray tracing unit performing ray tracing based on the acceleration structure; and a rasterization unit including a sharing interface for shader-sharing with the ray tracing unit and performing rasterization rendering by sharing shading information generated from a result of the ray tracing.

8 Claims, 7 Drawing Sheets

GRAPHICS PROCESSING APPARATUS BASED ON HYBRID GPU ARCHITECTURE

CROSS-REFERENCE TO PRIOR APPLICATION

This application claims priority to Korean Patent Application No. 10-2019-0042397, filed on Apr. 11, 2019, which is hereby incorporated by reference in its entirety.

BACKGROUND

The present invention relates to a graphics processing technique based on hybrid GPU architecture and, more particularly, to a graphics processing apparatus based on hybrid GPU architecture capable of hybrid graphics processing through interworking among different GPUs.

3D graphics technology is a technology used for three-dimensional representation of geometry data stored in a computing device and is widely used today for various industries including media and game industries. Ray tracing technique is capable of simulating various optical effects such as reflection, refraction, and shadow and capable of producing photorealistic 3D graphic images. Rasterization may be performed through a computation method which simply maps scene geometry into image pixels; although rasterization does not determine the color for each image pixel like a ray tracing technique, it may be generally used for fast processing such as real-time rendering.

The Korea laid-open patent No. 10-2015-0060871 (Jun. 3, 2015) relates to a hybrid engine for a central processing unit and a graphics processing unit. The laid-open patent provides a method for generating procedural textures which generates procedural textures more efficient and faster than the conventional process and which may actually be computed in real-time; and discloses a technique for generating procedural textures appropriate for providing an enhanced rendering speed without degrading quality of a generated image.

The Korea laid-open patent No. 10-2002-0068054 (Aug. 24, 2002) relates to a multiple and hybrid graphics display method. The laid-open patent enables multiple displays based on different types to be operated when a single workstation, personal computer, or embedded system attempts to use a single interface card and discloses a technique that allows dynamic switching among multiple displays in real-time.

PRIOR ART REFERENCES

Patent References

Korea laid-open patent No. 10-2015-0060871 (Jun. 3, 2015)
Korea laid-open patent No. 10-2002-0068054 (Aug. 24, 2002)

SUMMARY

One embodiment of the present invention provides a graphics processing apparatus based on hybrid GPU architecture capable of hybrid graphics processing through interworking among different GPUs.

One embodiment of the present invention provides a graphics processing apparatus based on hybrid GPU architecture which may allow shader-sharing for graphics processing by providing a physical connection among GPUs through a sharing interface.

One embodiment of the present invention provides a graphics processing apparatus based on hybrid GPU architecture capable of generating a hybrid image for a 3D scene through selective graphics processing between a ray tracing unit and a rasterization unit after partitioning a 2D frame into a plurality of sub-areas.

Among embodiments of the present invention, a graphics processing apparatus based on hybrid GPU architecture comprises an acceleration structure generation unit generating an acceleration structure based on geometry data related to a 3D scene; a ray tracing unit performing ray tracing based on the acceleration structure; and a rasterization unit including a sharing interface for shader-sharing with the ray tracing unit and performing rasterization rendering by sharing shading information generated from a result of the ray tracing.

The acceleration structure generation unit may include a primitive cache providing a primitive scene corresponding to the 3D scene, a working memory storing primitives during a process for generating an acceleration structure, and an acceleration structure buffer storing an acceleration structure constructed as a result of the generation process; and generate a dynamic acceleration structure for each frame in conjunction with the working memory and store the generated dynamic acceleration structure in a memory through the acceleration structure buffer.

The ray tracing unit may perform the ray tracing by performing a ray generation step, traversal test step, intersection test step, shading step, and texture mapping step; and when the intersection test step is completed, may perform the shading after performing synchronization with the rasterization unit by determining whether shader-sharing is possible through the sharing interface.

The ray tracing unit may perform the ray tracing by using a shader shared directly from the rasterization unit through the sharing interface at the shading step or texture mapping step.

The rasterization unit may perform the rasterization rendering by sequentially performing a vertex shader step, triangle setup step, fragment shader step, and fragment operation step.

The rasterization unit may perform the rasterization rendering by using shading information shared directly from the ray tracing unit through the sharing interface at the fragment shader step or fragment operation step.

The graphics processing apparatus may further comprise a hybrid graphics processing unit generating a hybrid image related to the 3D scene through selective graphics processing between the ray tracing unit and the rasterization unit.

The hybrid graphics processing unit may generate the hybrid image by sequentially performing determining a 2D frame related to the 3D scene; partitioning the 2D frame into a first area including dynamic objects, second area including static objects, and third area related to the background of the 3D scene; and generating an image about the 2D frame by selectively applying ray tracing rendering or rasterization rendering to the first to the third areas.

DETAILED DESCRIPTION

Figure 1:
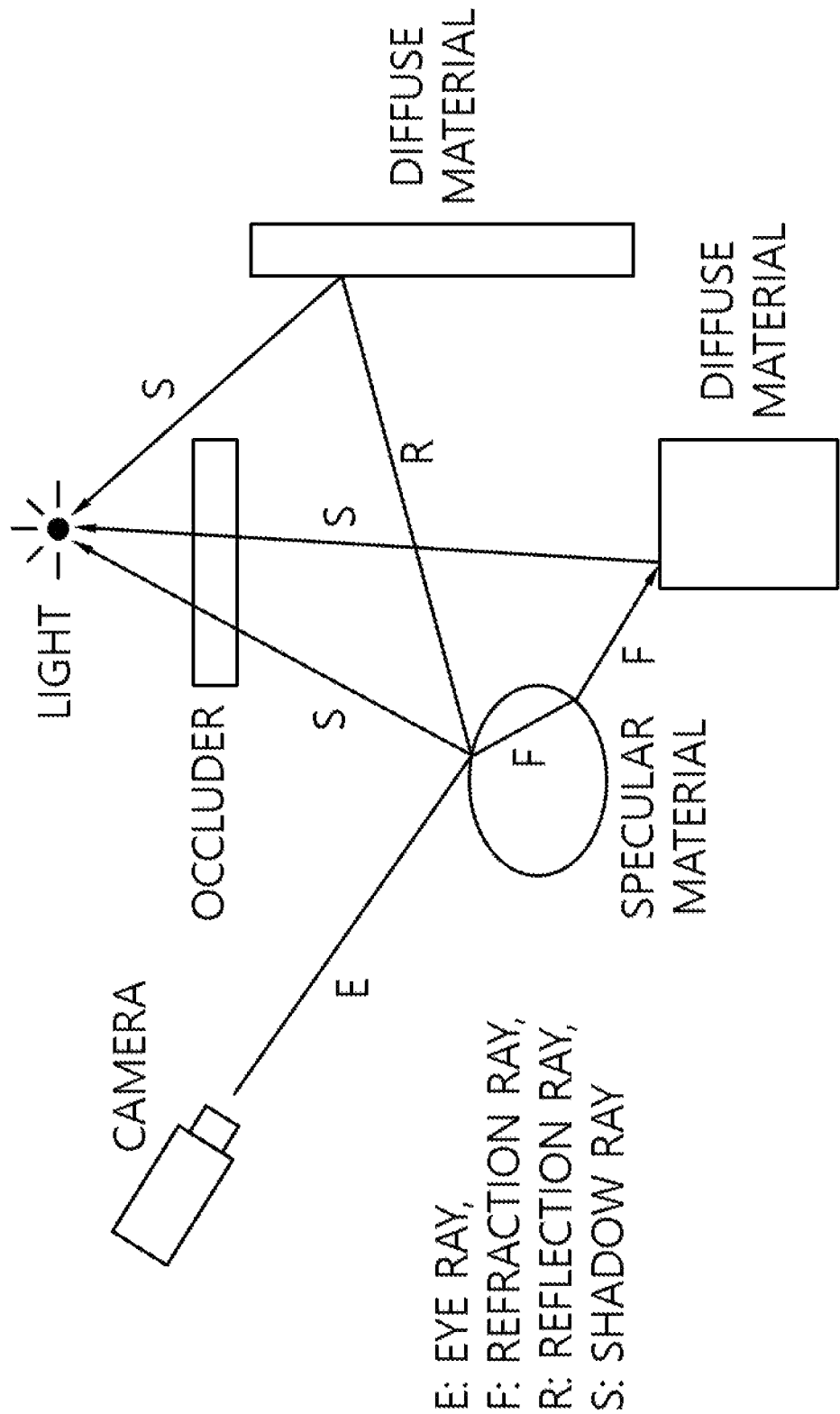
FIGS. 1 and 2 illustrate a ray tracing process performed by a ray tracing unit according to one embodiment of the present invention.

Since description of the present invention is merely an embodiment for illustrating structural or functional description, it should not be interpreted that the technical scope of the present invention is limited by the embodiments described in this document. In other words, embodiments may be modified in various ways and implemented in various other forms; therefore, it should be understood that various equivalents realizing technical principles of the present invention belong to the technical scope of the present invention includes. Also, since it is not meant that a specific embodiment should support all of the purposes or effects intended by the present invention or include only the purposes or effects, the technical scope of the disclosed invention should be not regarded as being limited to the descriptions of the embodiment.

Meanwhile, implication of the terms used in this document should be understood as follows.

The terms such as "first" and "second" are introduced to distinguish one element from the others, and thus the technical scope of the present invention should not be limited by those terms. For example, a first element may be called a second element, and similarly, the second element may be called the first element.

If a constituting element is said to be "connected" to other constituting element, the former may be connected to the other element directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe the operation order of the steps. Therefore, unless otherwise explicitly indicated in the context of description, the steps may be executed differently from the stated order. In other words, the respective steps may be performed in the same order as stated in the description, actually performed simultaneously, or performed in a reverse order.

The present invention may be implemented in the form of program codes in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device. Also, a computer-readable recording medium may be distributed may be distributed over computer systems connected to each other through a network so that computer-readable codes may be stored and executed in a distributed manner.

Unless defined otherwise, all of the terms used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

Figure 2:
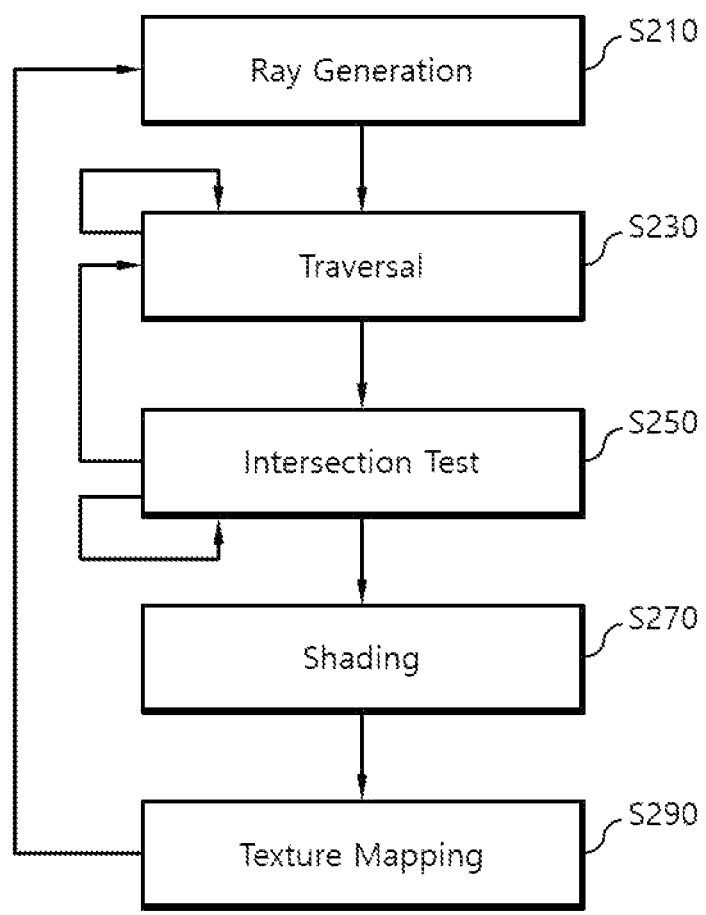

FIGS. 1 and 2 illustrate a ray tracing process performed by a ray tracing unit according to one embodiment of the present invention.

Referring to FIG. 1, an eye ray (E) is generated at the camera position for each pixel, and calculations are carried out to find an object hit by the ray (E). If the object hit by the corresponding ray (E) is a specular material which refracts the ray or a diffuse material which reflects the ray, a refraction ray (F) simulating the refraction effect and/or a reflection ray (R) simulating the reflection effect is generated at the point the corresponding ray (E) meets the object, and a shadow ray (S) may be generated in the direction of light. In one embodiment, if a shadow ray (S) hits another object (occluder), a shadow may be generated at the point where the corresponding shadow ray (S) has been generated.

Referring to FIG. 2, the ray tracing process may be performed recursively and may include (i) eye ray generation step S210, (ii) acceleration structure (AS) traversal step S230, (iii) intersection test step S250, (iv) shading step S270, and (v) texture mapping step S290.

The eye ray generation step S210 may generate at least one ray based on eye ray generation information and shading information. Eye ray generation information may include screen coordinates for generating an eye ray, and shading information may include a ray index for obtaining screen coordinates, coordinates of a ray-triangle hit point, color value, and shading ray type. Also, shading information may further include additional information according to the shading ray type.

Here, a shading ray may include a shadow ray (S), secondary ray or NULL ray; and the secondary ray may include a refraction ray (F) and/or reflection ray (R). The refraction ray (F) may include the refractive index of a ray-triangle hit point as additional information, and the reflection ray (R) may include reflectance of the ray-triangle hit point as additional information.

The acceleration structure traversal step S230 may find a leaf node which intersects a ray by searching nodes based on the acceleration structure. Here, the acceleration structure may correspond to a k-d tree, and the traversal process of the acceleration structure may correspond to recursion of the k-d tree.

The intersection test step S250 may correspond to a ray-triangle intersection test, which may read a triangle list belonging to a leaf node intersecting a ray and perform an intersection test for a given ray based on the coordinates of the corresponding triangle list. The shading step S270 may calculate the color value of the ray-triangle hit point and deliver shading information including the coordinates, color value, and shading ray type of the ray-triangle hit point to the next step. The texture mapping step S290 may generate an image for a current frame through texture mapping.

Since an image of a current frame may include both of a static and dynamic objects in the ray tracing process, the ray-triangle intersection test may be performed for each of the static and dynamic acceleration structures, and ray tracing may be performed based on the acceleration structure where ray meets triangles in the static or dynamic acceleration structure. During the ray tracing process, if the ray intersects a triangle in both of the static and dynamic acceleration structures, an acceleration structure for ray tracing may be determined based on the viewpoint of the ray and distances of the respective triangles hit by the ray.

In other words, since a triangle at a short distance may correspond to an object located close to the viewer, a triangle yielding a short distance among the respective distances of the triangles which intersect the viewpoint of the ray may be selected. For example, suppose the distance between the eye viewpoint and an intersecting triangle of the static acceleration structure is S1, and the distance between the eye viewpoint and an intersecting triangle of the dynamic acceleration structure is S2. If S1 is shorter than S2, ray tracing may be performed based on the triangle intersecting the static acceleration structure while, if S2 is shorter than S1, ray tracing may be performed based on the triangle intersecting the dynamic acceleration structure.

Figure 3:
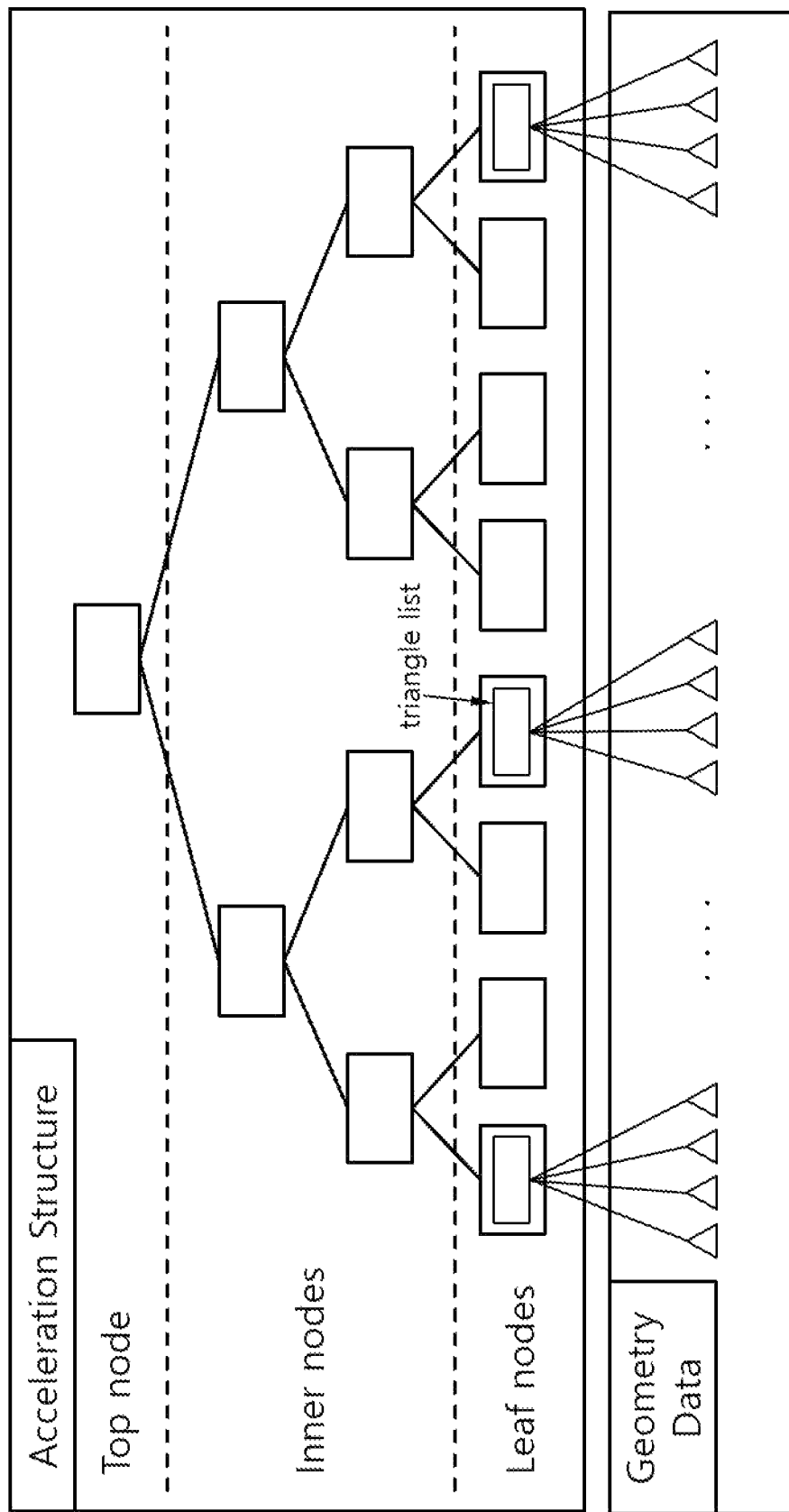
FIG. 3 illustrates an acceleration structure and geometry data used in a ray tracing process.

FIG. 3 illustrates an acceleration structure and geometry data used in a ray tracing process.

Referring to FIG. 3, the acceleration structure (AS) may include a k-d tree (k-depth tree) or bounding volume hierarchy (BVH) commonly used for ray tracing. FIG. 3 illustrates an acceleration structure based on a k-d tree.

A k-d tree is one of spatial partitioning tree structures, which may be used for the ray-triangle intersection test. A k-d tree may include a top node, inner nodes, and leaf nodes, where a leaf node may include a triangle list for pointing at least one triangle included in the geometry data. In one embodiment, if triangle information included in the geometry data is implemented in the form of an array, the triangle list included in the leaf node may correspond to an array index.

Figure 4:
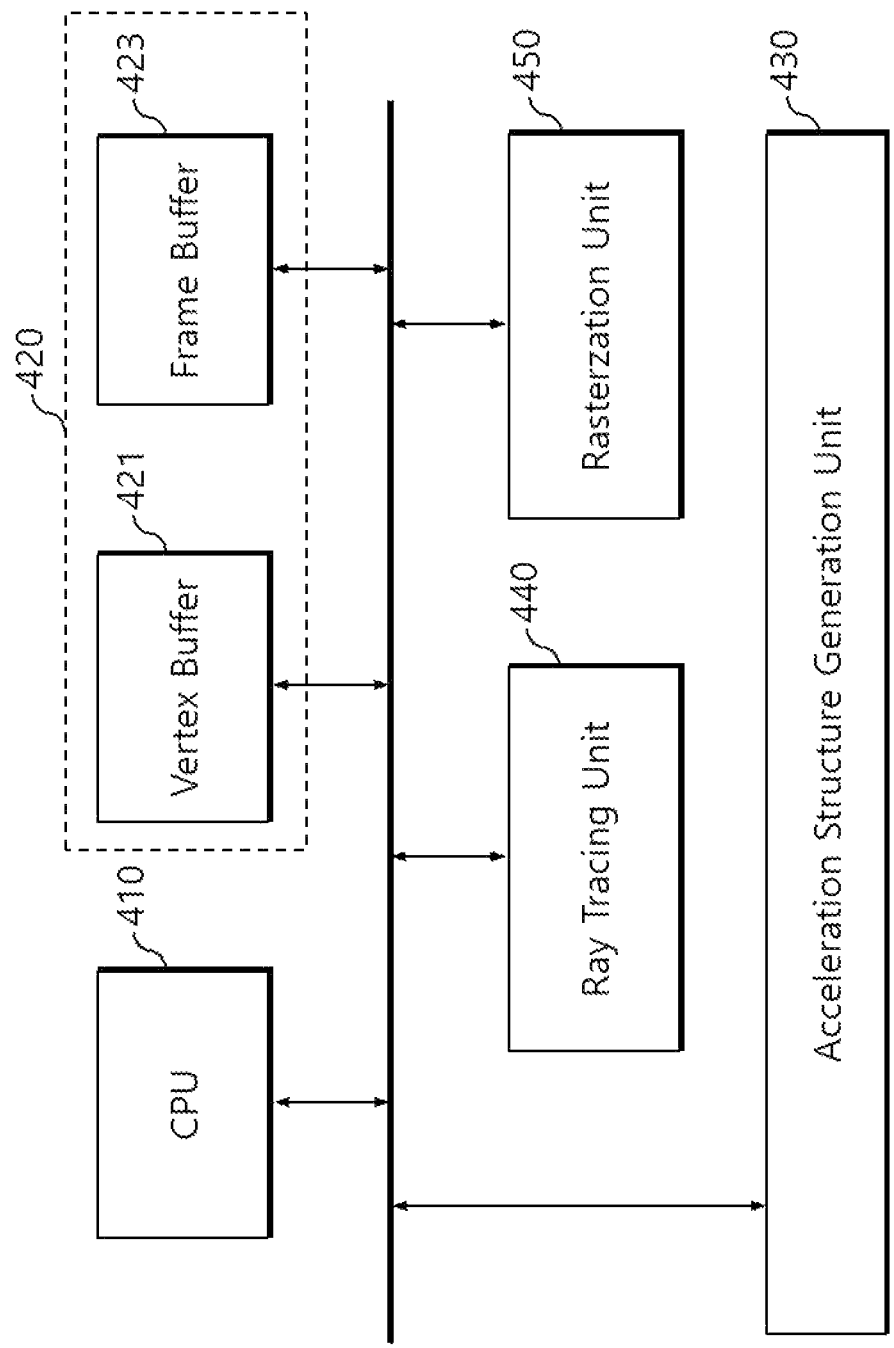
FIG. 4 illustrates a graphics processing apparatus according to one embodiment of the present invention.

FIG. 4 illustrates a graphics processing apparatus according to one embodiment of the present invention.

Referring to FIG. 4, a graphics processing apparatus based on hybrid GPU architecture (in what follows, it is called a graphics processing apparatus) 400 may include a central processing unit 410, system memory 420, acceleration structure generation unit 430, ray tracing unit 440, and rasterization unit 450.

The graphics processing apparatus 400 may correspond to a computing device capable of generating and reproducing an image of a 3D scene; and may be implemented by a smartphone, notebook, or computer; however, the user terminal is not necessarily limited to the aforementioned examples and may be implemented by various devices such as a tablet PC. The graphics processing apparatus 400 may be implemented by including a graphic processor operating independently for graphics processing. Also, the graphics processing apparatus 400 may be implemented by include a display module for reproducing an image, where the display module may perform an operation of displaying images stored in a frame buffer sequentially.

The Central Processing Unit (CPU) 410 may control the overall operation of the graphics processing apparatus 400; manage a control flow or a data flow among the acceleration structure generation unit 430, ray tracing unit 440, and rasterization unit 450; and control access to the system memory 420 and an external memory.

In one embodiment, the CPU 410 may update a dynamic object by performing Level Of Detail (LOD) operations on the dynamic object. The LOD operation may include reduction of complexity of representing 3D objects when an object moves away from a viewer or according to different criteria such as object importance, eye-space speed or position. For example, if a dynamic object moves away from a viewer, the CPU 410 may update the dynamic object by using coarse representation. On the other hand, if a dynamic object gets close to the viewer, the CPU 410 may update the dynamic object by using refined representation.

The system memory 420 may be accessed by the CPU 410, acceleration structure generation unit 430, ray tracing unit 440, and rasterization unit 450; and may store geometry data and texture data of static and dynamic objects comprising a 3D scene. An external memory may be accessed by the ray tracing unit 440 and rasterization unit 450; and may store static objects, dynamic objects, texture data, and acceleration structures about static and dynamic objects separately. However, the system memory 420 and the external memory are separated only from a logical viewpoint, which is not necessarily limited to this distinction, and may be implemented being integrated into one memory depending on their operating environment.

In one embodiment, the system memory 420 may include a vertex buffer 421 and a frame buffer 423. The vertex buffer 421 may correspond to the area on the system memory which stores information about vertices comprising a 3D scene. The frame buffer 423 may correspond to the area on the system memory which stores a result of graphics processing of a 3D scene.

The acceleration structure generation unit 430 may generate an acceleration structure based on geometry data of a 3D scene. A 3D scene may include a static object which does not actively move and a dynamic object which moves actively; and the static and dynamic objects may comprise geometry data. The acceleration structure generation unit 430 may generate a static acceleration structure for static objects and a dynamic acceleration structure for dynamic objects respectively and in particular, the dynamic acceleration structure may be newly reconstructed by reflecting the information updated for each frame.

In one embodiment, the acceleration structure generation unit 430 may include a primitive cache providing a primitive scene corresponding to a 3D scene, a working memory storing primitives during a process for generating an acceleration structure, and an acceleration structure buffer storing an acceleration structure constructed as a result of the generation process; and generate a dynamic acceleration structure for each frame in conjunction with the working memory and store the generated dynamic acceleration structure in a memory through the acceleration structure buffer. Here, it is assumed that the dynamic acceleration structure is stored in an external memory; however, the present invention is not limited to the specific example. The acceleration structure generation unit will be described in more detail.

The ray tracing unit 440 may perform ray tracing based on the acceleration structure generated by the acceleration structure generation unit 430 and as a result, generate an image for a frame and store the generated image into the frame buffer 423. In other words, the ray tracing unit 440 may correspond to a graphic processor which performs ray tracing.

In one embodiment, the ray tracing unit 440 may perform ray tracing by performing a ray generation step, traversal test step, intersection test step, shading step, and texture mapping step and when the intersection test step is completed, may perform the shading step after performing synchronization with the rasterization unit by determining whether shader-sharing is possible through the sharing interface.

In other words, the ray tracing unit 40 checks if a shader of the rasterization unit 450 is currently in operation during the ray tracing process and if it is found that the shader may be shared, may perform ray tracing by using the shader function. To this purpose, through synchronization, the ray tracing unit 440 may utilize the shader implemented in the rasterization unit 450 for the ray tracing process. Therefore, during synchronization, operation of the rasterization unit 450 may be limited. In particular, the ray tracing unit 440 may request sharing of the shader together with input information through the sharing interface and as a response to the request, may receive a shader result about the input information.

In one embodiment, the ray tracing unit 440 may perform ray tracing by using a shader shared directly from the rasterization unit through the sharing interface at the shading step or texture mapping step. For example, the ray tracing unit 440 may use a vertex shader to obtain information about vertices from a static or dynamic objects and use a fragment shader to determine a color value of a specific pixel. The ray tracing unit 440 may perform control about a shader operation through the shading interface and obtain rights for shader control beforehand from the rasterization unit 450 during a synchronization process for performing control about the shader operation.

The rasterization unit 450 may perform rasterization rendering by sharing shading information generated during a ray tracing process. The rasterization unit 450 may receive shading information through shader-sharing with the ray tracing unit 440; to this purpose, the rasterization unit 450 may be implemented by including a sharing interface physically connected to the ray tracing unit 440.

In one embodiment, the rasterization unit 450 may perform rasterization rendering by performing a vertex shader step, triangle setup step, fragment shader step, and fragment operation step sequentially. Rasterization rendering may correspond to the process of generating an image for a 2D frame by using a 3D scene as an input. The rasterization unit 450 may perform rasterization rendering by using vertex information stored in the vertex buffer 421 of the system memory 420 and store a result of the rasterization rendering into the frame buffer 423.

The vertex shader step may perform processing of each pixel based on a vertex set read from the vertex buffer 421 and process such effects as transformation, lighting, and mapping. Transformation may include world transformation which integrates each individual object comprising a 3D scene into the world space, camera transformation which transforms the world space into the camera space as seen by a viewer (or a camera), and projective transformation which transforms the camera space into the projective space for generating 2D images.

The triangle setup step may group vertices which have gone through the vertex shader step into a primitive, where, for example, a primitive may correspond to a triangle. Therefore, the triangle setup step may group three vertices to define a triangle and include a process for identifying pixels belonging to the inside of the corresponding triangle.

The fragment shader step may allocate a fragment for all of the pixels constituting a triangle and assign a color to each fragment. A color assignment process may be performed through a process for calculating lighting for the whole pixels constituting a fragment or a process for performing texture mapping.

The fragment operation step may integrate fragments and store the integrated fragments into the frame buffer 423. Colors for all of the pixels comprising each fragment integrated into the frame buffer 423 may be determined through blending, where blending may correspond to the process for integrating colors of the pixels of each fragment and colors of the pixels stored in the frame buffer into a single color.

In one embodiment, the rasterization unit 450 may perform rasterization rendering by using shading information shared directly from the ray tracing unit 440 through the sharing interface at the fragment shader step or fragment operation step. More specifically, the rasterization unit 450 may assign a color based on the shading information shared from the ray tracing unit 440 during a process for assigning a color to a fragment at the fragment shader step. Also, the rasterization unit 450 may apply the shading information shared from the ray tracing unit 440 together during a process for integrating fragments at the fragment operation step.

Figure 5:
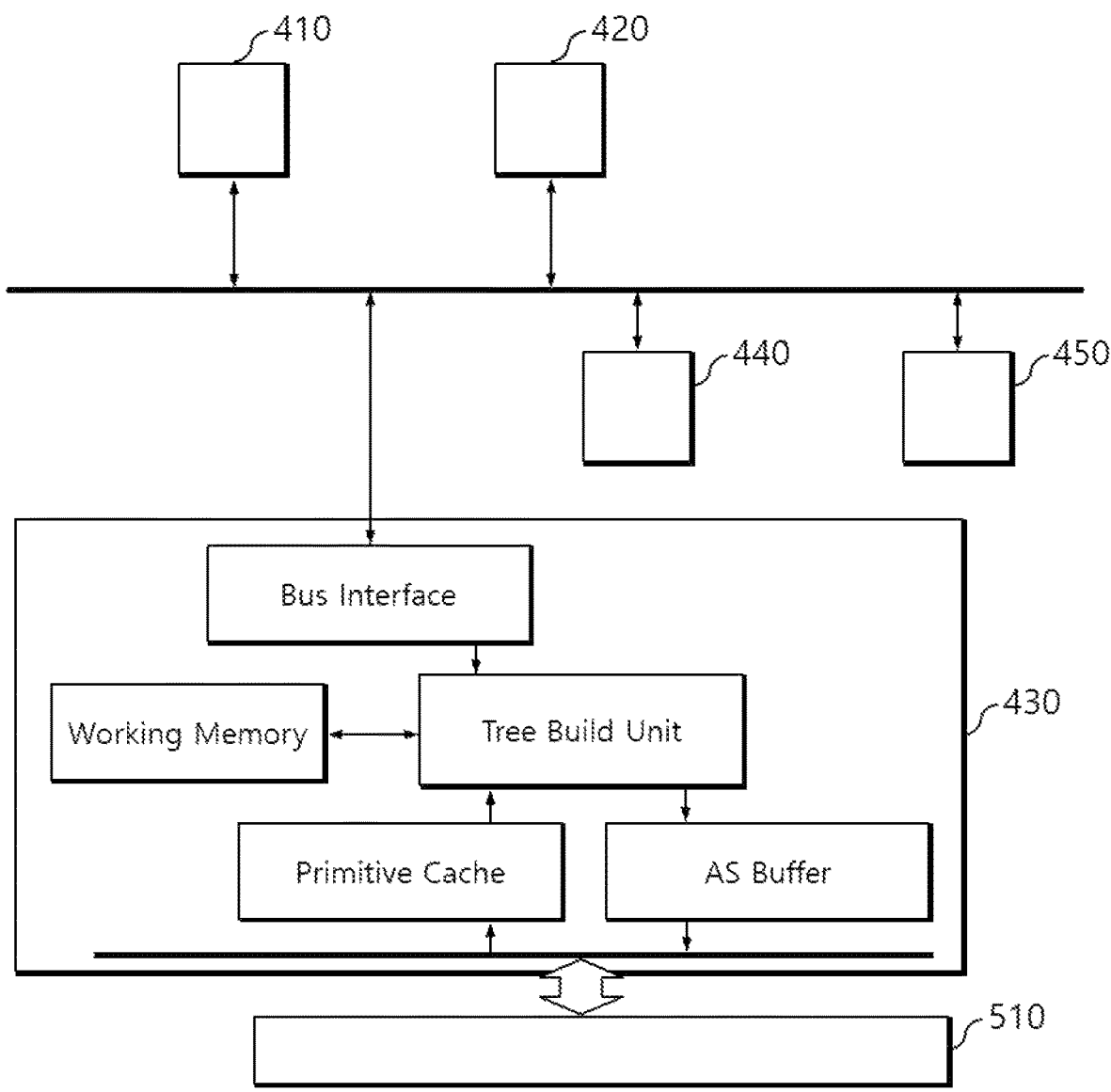
FIG. 5 illustrates the acceleration structure generation unit of FIG. 4.

FIG. 5 illustrates the acceleration structure generation unit of FIG. 4.

Referring to FIG. 5, the acceleration structure generation unit 430 may generate an acceleration structure in conjunction with the CPU 410 or system memory 420 through a bus interface. In one embodiment, the acceleration structure generation unit 430 may generate a static acceleration structure for static objects based on geometry data stored in the system memory 420 and generate a dynamic acceleration structure for dynamic objects. In particular, when a change occurs in the dynamic object, the acceleration structure generation unit 430 may reconstruct the dynamic acceleration structure for each frame based on the corresponding change information.

In one embodiment, the acceleration structure generation unit 430 may include a primitive cache which provides a primitive scene corresponding to a 3D scene, working memory which stores primitives during a process for generating an acceleration structure, and acceleration structure buffer which stores an acceleration structure; and generate a dynamic acceleration structure for each frame in conjunction with the working memory and store the generated dynamic acceleration structure into the external memory 510 through the acceleration structure buffer. Here, the acceleration structure generation unit 430 is assumed to store the dynamic acceleration structure only into the external memory 510; however, the present invention is not necessarily limited to the specific assumption, and the same operation may be performed in conjunction with an internal memory or the system memory depending on the implementation environment. In particular, the external, internal, or system memory may be defined being identified logically within one memory area.

The primitive cache may read geometry data stored in the external memory and store primitives used for constructing an acceleration structure. The working memory may correspond to the internal memory of the acceleration structure generation unit 430 and store information about primitives associated with the process for generating an acceleration structure. In one embodiment, the acceleration structure generation unit 430 may be implemented by including a plurality of working memories and in this case, may further include a sharing control module for controlling access to the plurality of working memories. The acceleration structure buffer may store a generated acceleration structure and provide the generated accelerated structure to the external memory 510.

Also, the acceleration structure generation unit 430 may use a k-d tree (k-depth tree) or Bounding Volume Hierarchy (BVH) as an acceleration structure and may include a tree build unit which constructs a tree. The tree build unit may generate an acceleration structure based on the primitives received from the external memory 510 through the primitive cache and store the generated acceleration structure into the external memory 510 through the acceleration structure buffer. The external memory 510 may be implemented as a separate memory physically distinguished from the system memory 420 and depending on the needs, may be identified logically by being implemented inside the system memory 420.

Figure 6:
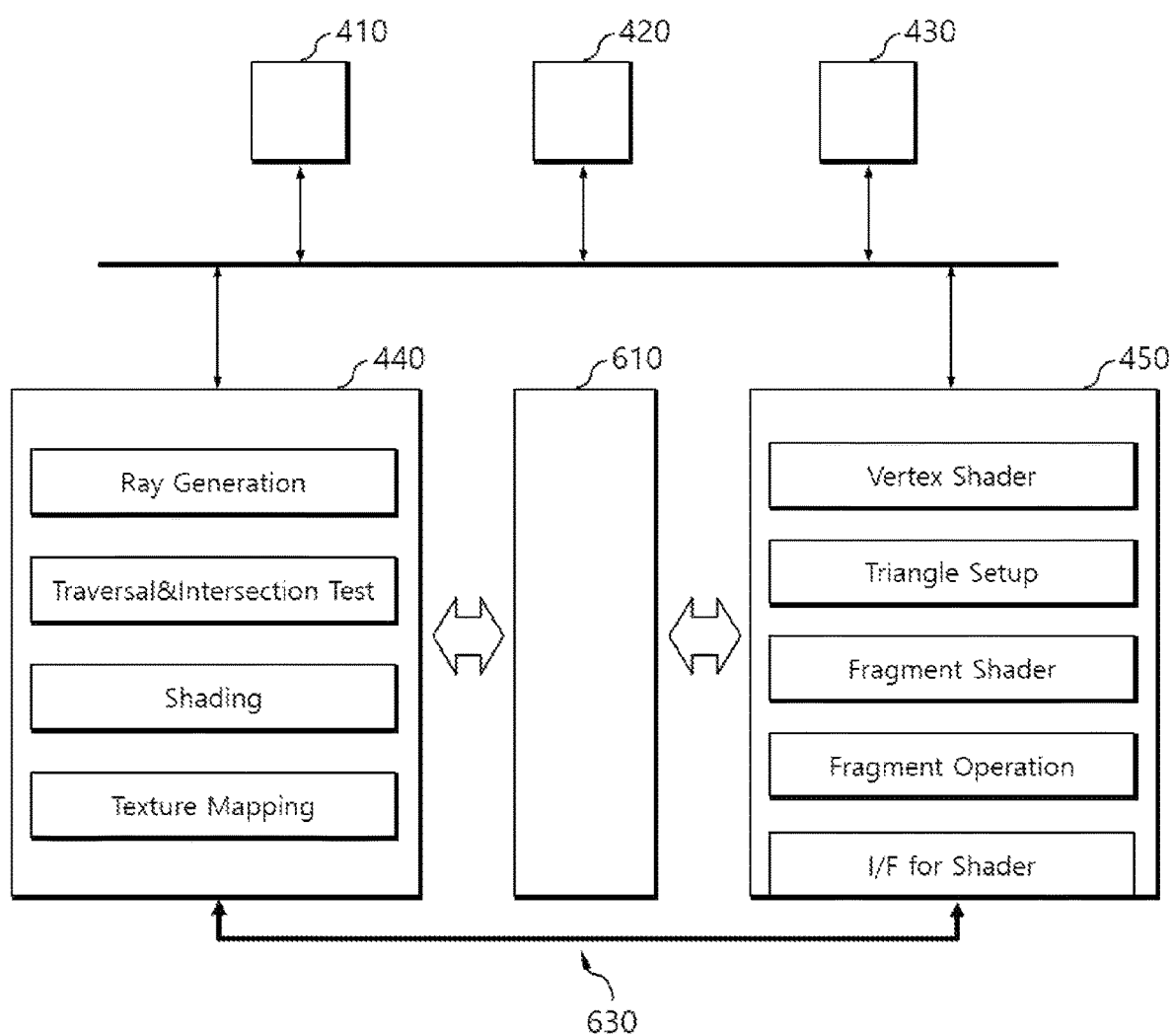
FIG. 6 illustrates a graphics processing apparatus according to one embodiment of the present invention.

FIG. 6 illustrates a graphics processing apparatus according to one embodiment of the present invention.

Referring to FIG. 6, the graphics processing apparatus 400 may be implemented by including the ray tracing unit 440 and the rasterization unit 450. Both of the ray tracing unit 440 and the rasterization unit 450 may be implemented by including an independent graphic processor capable of graphics processing of a 3D scene and may be connected physically to each other through the sharing interface 630.

In one embodiment, the graphics processing apparatus 400 may further include a hybrid graphics processing unit 610 which generates a hybrid image of a 3D scene through selective graphics processing between the ray tracing unit 440 and the rasterization unit 450. For graphics processing, the graphics processing apparatus 400 may generate an image for each frame by executing independent pipelines of the ray tracing unit 440 or rasterization unit 450 and generate an image for each frame by performing selective graphics processing between the ray tracing unit 440 and the rasterization unit 450 through the hybrid graphics processing unit 610.

In other words, a hybrid image may correspond to an image generated by integrating the respective results of ray tracing rendering and rasterization rendering. In particular, shading information of the ray tracing rendering process may be utilized for the rasterization rendering process, and the shader of the rasterization unit 450 may be utilized for the ray tracing rendering process.

In one embodiment, the hybrid graphics processing unit 610 may generate a hybrid image by sequentially performing determining a 2D frame related to a 3D scene; partitioning the 2D frame into a first area including dynamic objects, second area including static objects; and third area related to the background of the 3D scene; and generating an image about the 2D frame by selectively applying ray tracing rendering or rasterization rendering to the first to the third areas.

A 2D frame may correspond to an area occupying a specific range determined by a viewer located at a specific position in the 3D space or by a camera's viewpoint; and the graphics processing apparatus may generate an image for the corresponding 2D frame. The hybrid graphics processing unit 610 may be defined a first or a second area for each object, and therefore, a plurality of first or second areas may exist within one frame. Depending on the needs, the third area related to the background may be defined by being included in the second area for static objects.

For example, the hybrid graphics processing unit 610 may perform ray tracing rendering for the first area and perform rasterization rendering for the second and third areas. As another example, the hybrid graphics processing unit 610 may perform ray tracing rendering for the first and the second areas; and may perform rasterization rendering for the third area. The hybrid graphics processing unit 610 may receive rendering results from the ray tracing unit 440 and the rasterization unit 450 and integrate the received rendering results into one image.

Figure 7:
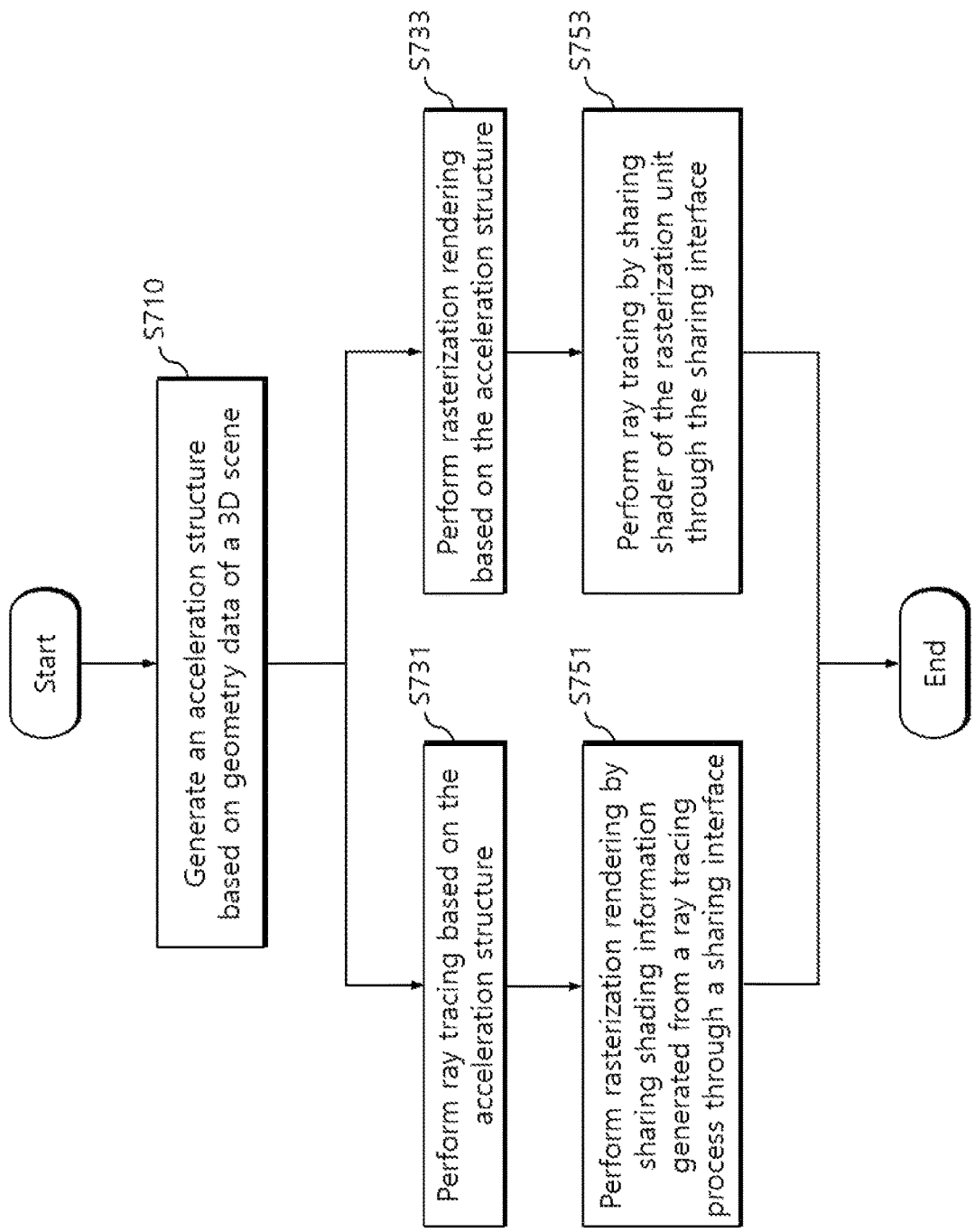
FIG. 7 is a flow diagram illustrating a graphics processing process performed by a graphics processing apparatus according to one embodiment of the present invention.

FIG. 7 is a flow diagram illustrating a graphics processing process performed by a graphics processing apparatus according to one embodiment of the present invention.

The graphics processing apparatus 400 may perform graphics processing of a 3D scene and may be implemented by including the ray tracing unit 440 which performs ray tracing and the rasterization unit 450 which performs rasterization rendering. In particular, the ray tracing unit 440 and the rasterization unit 450 may share the shader between them by being connected physically to each other through a sharing interface.

In one embodiment, the graphics processing apparatus 400 may generate an acceleration structure (S710) based on the geometry data of a 3D scene through the acceleration structure generation unit 430, perform ray tracing based on the acceleration structure through the ray tracing unit 440 (S731), and perform rasterization rendering by sharing the shading information generated from the ray tracing process through the rasterization rendering unit 450 (S751).

In another embodiment, the graphics processing apparatus 400 may perform rasterization rendering based on the acceleration structure through the rasterization rendering unit 450 (S733) and perform ray tracing by sharing the shader of the rasterization unit 450 through the ray tracing unit 440 (S753).

Although the present invention has been described with reference to preferred embodiments given above, it should be understood by those skilled in the art that various modifications and variations of the present invention may be made without departing from the technical principles and scope specified by the appended claims below.

The disclosed invention may provide the following effects. However, since it is not meant that a specific embodiment has to provide all of the following effects or only the effects, the technical scope of the disclosed invention should not be regarded as being limited by the specific embodiment.

A graphics processing apparatus based on hybrid GPU architecture according to one embodiment of the present invention may share a shader for graphics processing by providing a physical connection between GPUs through a sharing interface.

A graphics processing apparatus based on hybrid GPU architecture according to one embodiment of the present invention may generate a hybrid image about a 3D scene through selective graphics processing between a ray tracing unit and a rasterization unit after partitioning a 2D frame into a plurality of areas.

What is claimed is:

1. A graphics processing apparatus based on hybrid GPU architecture, the apparatus comprising:
   an acceleration structure generation unit generating an acceleration structure based on geometry data related to a 3D scene;
   a ray tracing unit performing ray tracing based on the acceleration structure; and
   a rasterization unit including a sharing interface for shader-sharing with the ray tracing unit and performing rasterization rendering by sharing shading information generated from a result of the ray tracing, wherein the ray tracing unit performs the ray tracing by using a shader shared directly from the rasterization unit through the sharing interface, wherein the rasterization unit performs the rasterization rendering by using shading information shared directly from the ray tracing unit through the sharing interface, and wherein the acceleration structure generation unit, the ray tracing unit, and the rasterization unit are each implemented via at least one processor.

2. The apparatus of claim 1, wherein the acceleration structure generation unit includes:
 a primitive cache providing a primitive scene corresponding to the 3D scene;
 a working memory storing primitives during a process for generating an acceleration structure; and
 an acceleration structure buffer storing the acceleration structure; and
 generates a dynamic acceleration structure for each frame in conjunction with the working memory and stores the generated dynamic acceleration structure in a memory through the acceleration structure buffer.

3. The apparatus of claim 1, wherein the ray tracing unit performs the ray tracing by performing ray generation, traversal testing, intersection testing, shading, and texture mapping; and
 when the intersection testing is completed, the ray tracing unit performs the shading after performing synchronization with the rasterization unit by determining whether shader-sharing is possible through the sharing interface.

4. The apparatus of claim 3, wherein the ray tracing unit performs the ray tracing by using a shader shared directly from the rasterization unit through the sharing interface at the shading or the texture mapping.

5. The apparatus of claim 1, wherein the rasterization unit performs the rasterization rendering by sequentially performing vertex shading, triangle setup, fragment shading, and fragment operation.

6. The apparatus of claim 5, wherein the rasterization unit performs the rasterization rendering by using the shading information at the fragment shading or the fragment operation.

7. The apparatus of claim 1, further comprising a hybrid graphics processing unit generating a hybrid image related to the 3D scene through selective graphics processing between the ray tracing unit and the rasterization unit,
 wherein the hybrid graphics processing unit is implemented via at least one processor.

8. The apparatus of claim 7, wherein the hybrid graphics processing unit generates the hybrid image by sequentially performing:
 determining a 2D frame related to the 3D scene;
 partitioning the 2D frame into a first area including dynamic objects, a second area including static objects, and a third area related to a background of the 3D scene; and
 generating an image about the 2D frame by selectively applying ray tracing rendering or rasterization rendering to the first to the third areas.

* * * * *